(12) United States Patent
Maehara et al.

(10) Patent No.: US 7,288,922 B2
(45) Date of Patent: Oct. 30, 2007

(54) CONTROL APPARATUS FOR AUTOMOTIVE ALTERNATOR HAVING CAPABILITY TO ACCURATELY DETECT TEMPERATURE OF ALTERNATOR

(75) Inventors: Fuyuki Maehara, Nagoya (JP); Kazuyuki Watanabe, Takahama (JP)

(73) Assignee: Denso Corporation, Kariya (JP)

( * ) Notice: Subject to any disclaimer, the term of this patent is extended or adjusted under 35 U.S.C. 154(b) by 11 days.

(21) Appl. No.: 11/409,001

(22) Filed: Apr. 24, 2006

(65) Prior Publication Data

US 2006/0238172 A1 Oct. 26, 2006

(30) Foreign Application Priority Data

Apr. 25, 2005 (JP) ............................. 2005-125874

(51) Int. Cl.
*H02H 7/06* (2006.01)
*H02P 9/00* (2006.01)
*H02P 11/00* (2006.01)
*H02K 21/00* (2006.01)
*H02K 23/00* (2006.01)

(52) U.S. Cl. .................. 322/33; 322/28; 318/254; 290/40 C

(58) Field of Classification Search ................. 322/28, 322/33; 318/254; 290/40 C
See application file for complete search history.

(56) References Cited

U.S. PATENT DOCUMENTS

| | | | | |
|---|---|---|---|---|
| 4,023,089 A | * | 5/1977 | Arakane | 322/28 |
| 4,060,753 A | * | 11/1977 | Okuyama et al. | 318/700 |
| 4,259,628 A | * | 3/1981 | Iwakane et al. | 318/799 |
| 4,275,344 A | * | 6/1981 | Mori et al. | 322/28 |
| 4,330,741 A | * | 5/1982 | Nagase et al. | 318/803 |
| 4,357,569 A | * | 11/1982 | Iwakane et al. | 318/721 |
| 4,721,894 A | * | 1/1988 | Graber | 318/473 |
| 4,897,584 A | * | 1/1990 | Grutzmacher et al. | 318/471 |
| 5,008,771 A | * | 4/1991 | Palara | 361/103 |
| 5,123,081 A | * | 6/1992 | Bachman et al. | 388/815 |
| 5,198,744 A | | 3/1993 | Kohl et al. | |
| 5,296,789 A | * | 3/1994 | Ohi | 318/254 |
| 5,481,460 A | * | 1/1996 | Masaki et al. | 701/50 |

(Continued)

FOREIGN PATENT DOCUMENTS

JP     A-62-23389 A2     1/1987

(Continued)

*Primary Examiner*—Darren Schuberg
*Assistant Examiner*—Pedro J. Cuevas
(74) *Attorney, Agent, or Firm*—Oliff & Berridge PLC

(57) ABSTRACT

A control apparatus for a vehicle generator includes a switch, a regulator, a fault condition detector, and a PWM signal generator. The switch is selectively turned on and off so as to intermittently excite the generator. The regulator controls on/off operation of the switch so as to bring an output of the generator into agreement with a target value. The fault condition detector detects a fault condition of the generator. The PWM signal generator generates and outputs a PWM signal that has a duty determined as a function of a duty of the on/off operation of the switch and a frequency determined based on if the fault condition of the generator is detected by the fault condition detector. Consequently, the control apparatus can inform an external control apparatus of the duty of the on/off operation of the switch and the fault condition of the generator with the single PWM signal.

18 Claims, 3 Drawing Sheets

U.S. PATENT DOCUMENTS

| | | | |
|---|---|---|---|
| 5,510,687 A * | 4/1996 | Ursworth et al. | 318/727 |
| 5,645,352 A * | 7/1997 | Menten | 374/183 |
| 5,670,854 A * | 9/1997 | Matsuura et al. | 318/432 |
| 5,701,066 A * | 12/1997 | Matsuura et al. | 318/808 |
| 5,703,410 A * | 12/1997 | Maekawa | 290/40 C |
| 5,731,689 A * | 3/1998 | Sato | 322/25 |
| 5,811,956 A * | 9/1998 | Yamamoto | 318/801 |
| 5,993,351 A * | 11/1999 | Deguchi et al. | 477/5 |
| 6,049,182 A * | 4/2000 | Nakatani et al. | 318/432 |
| 6,184,601 B1 * | 2/2001 | Baer et al. | 310/68 C |
| 6,190,282 B1 * | 2/2001 | Deguchi et al. | 477/5 |
| 6,504,358 B1 * | 1/2003 | Maier et al. | 324/158.1 |
| 6,611,124 B2 * | 8/2003 | Ishida | 318/727 |
| 6,769,804 B2 * | 8/2004 | Kawakatsu | 374/118 |
| 6,809,428 B1 * | 10/2004 | Blackburn et al. | 290/37 R |
| 6,817,760 B2 * | 11/2004 | Mende et al. | 374/152 |
| 7,061,247 B2 * | 6/2006 | Inokuchi et al. | 324/430 |
| 7,116,081 B2 * | 10/2006 | Wilson | 322/33 |
| 2001/0026140 A1 * | 10/2001 | Ishida | 318/727 |
| 2002/0093259 A1 * | 7/2002 | Sunaga et al. | 310/68 R |
| 2003/0217714 A1 * | 11/2003 | Yoeda et al. | 123/90.11 |
| 2004/0113593 A1 * | 6/2004 | Aoyama | 322/28 |
| 2004/0145186 A1 * | 7/2004 | Inokuchi et al. | 290/40 C |
| 2004/0222772 A1 * | 11/2004 | Fujita et al. | 322/28 |
| 2005/0244713 A1 * | 11/2005 | Honbo et al. | 429/225 |
| 2005/0247281 A1 * | 11/2005 | Honbo et al. | 123/179.4 |
| 2006/0113799 A1 * | 6/2006 | Obayashi et al. | 290/40 B |

FOREIGN PATENT DOCUMENTS

| | | |
|---|---|---|
| JP | A-4-229100 A2 | 8/1992 |
| JP | A-10-210679 A2 | 8/1998 |

* cited by examiner

CONTROL APPARATUS FOR AUTOMOTIVE ALTERNATOR HAVING CAPABILITY TO ACCURATELY DETECT TEMPERATURE OF ALTERNATOR

CROSS-REFERENCE TO RELATED APPLICATION

This application is based on and claims priority from Japanese Patent Application No. 2005-125874, filed on Apr. 25, 2005, the content of which is hereby incorporated by reference into this application.

BACKGROUND OF THE INVENTION

1. Technical Field of the Invention

The present invention relates generally to electric generators and electric power generation systems.

More particularly, the invention relates to a control apparatus for an automotive alternator, which has a capability to accurately detect the temperature of each component of the automotive alternator.

2. Description of the Related Art

An existing control apparatus for an electric generator is disclosed, for example, in Japanese Patent First Publication No. H04-229100, an English equivalent of which is U.S. Pat. No. 5,198,744.

The existing control apparatus detects the temperature of the control apparatus itself, the rotational speed (or, the number of revolutions) of the electric generator, and the duty of an intermittent exciting current supply to the electric generator. Based on all of the detected parameters, the control apparatus further determines the temperature of each component of the electric generator. When the determined temperature is above a predetermined upper limit, the control apparatus limits the power output of the electric generator through limiting the exciting current supply, thereby preventing overheating of the electric generator.

However, with the existing control apparatus, it may be difficult to accurately determine the temperature of each component of the electric generator.

More specifically, to accurately determine a temperature of the electric generator, it is necessary to first accurately determine the ambient (or outside) air temperature and the increasing amount of the temperature of the electric generator due to the power generating operation.

Since the temperature of the control apparatus depends on the ambient air temperature, the exciting current, and the rotational speed of the electric generator, it is possible to reversely determine the ambient air temperature based on the temperature of the control apparatus, the exciting current, and the rotational speed of the electric generator.

However, in the existing control apparatus, the duty of the intermittent exciting current supply to the electric generator is used, instead of the exciting current. Since the resistance of the exciting winding changes with temperature, it is impossible to accurately determine the exciting current based on the duty of the intermittent exciting current supply. Consequently, it is impossible to accurately determine the ambient air temperature, resulting in a large deviation between the determined and actual temperatures of the electric generator.

Moreover, during transient states, the temperature of the electric generator generally changes more gradually than that of the control apparatus.

However, such a fact is not considered in the existing control apparatus. Consequently, when the temperature of the control apparatus quickly rises due to a high load imposed on the electric generator for a short time, the power output of the electric generator may be limited despite the actual temperature of the electric generator having not yet reached to the predetermined upper limit.

Furthermore, without high accuracy in determination of the temperature of the electric generator, it is impossible for the control apparatus to accurately determine other parameters, such as the driving torque of the electric generator and the output current of the electric generator, based on the determined temperature of a stator winding of the electric generator. As an alternative, special detecting devices or sensors may be included in the control apparatus to accurately detect those parameters; however, this will increase the manufacturing cost of the control apparatus.

SUMMARY OF THE INVENTION

The present invention has been made in view of the above-mentioned problems.

It is, therefore, an object of the present invention to provide an inexpensive electric generator temperature detecting device which can detect the temperature of each component of an electric generator with high accuracy.

It is another object of the present invention to provide a control apparatus for an electric generator which includes the electric generator temperature detecting device to perform various suitable controls over the electric generator without causing the electric generator to overheat.

According to the present invention, an electric generator temperature detecting device for detecting a temperature of an electric generator is provided, which includes a control apparatus temperature detector, a rotational speed detector, an exciting current detector, and an electric generator temperature determiner.

The control apparatus temperature detector is configured to detect a temperature of a control apparatus, which is electrically connected to an electric generator including an exciting winding and controls supply of an exciting current to the exciting winding, and output a control apparatus temperature signal representative of the detected temperature of the control apparatus.

The rotational speed detector is configured to detect a rotational speed of the electric generator and output a rotational speed signal representative of the detected rotational speed.

The exciting current detector is configured to detect the exciting current supplied to the exciting winding of the electric generator and output an exciting current signal representative of the detected exciting current.

The electric generator temperature determiner is configured to determine a temperature of the electric generator based on the control apparatus temperature signal from the control apparatus temperature detector, the rotational speed signal from the rotational speed detector, the exciting current signal from the exciting current detector, and an output voltage of the electric generator and output an electric generator temperature signal representative of the determined temperature of the electric generator.

In a preferred embodiment of the invention, the electric generator temperature determiner is configured to determine a static temperature which the electric generator has in a static state thereof and a transient temperature, which the electric generator has at a time instant during a transient state thereof, based on the static temperature and a predetermined operation parameter associated with a rate of change in the temperature of the electric generator during the transient state.

Further, the operation parameter may be a time constant for the change in the temperature of the electric generator during the transient state.

In the preferred embodiment of the invention, the electric generator temperature determiner is configured to determine the temperature of the electric generator by using predetermined operation parameters that are specific to an electric generator type to which the electric generator belongs.

In the preferred embodiment of the invention, the electric generator temperature detecting device is integrated into the control apparatus.

The control apparatus further includes a communication controller that is configured to control communication of the control apparatus with an external, and the communication controller sends the electric generator temperature signal from the electric generator temperature determiner to the external.

The control apparatus further includes a power output limiter that is configured to limit a power output of the electric generator when the temperature of the electric generator determined by the electric generator temperature determiner is above a predetermined upper limit.

The control apparatus further includes a switch that is configured to be selectively turned on and off to intermittently supply the exciting current to the exciting winding of the electric generator, and the power output limiter may limit the power output of the electric generator through decreasing a duty of the on/off operation of the switch.

Otherwise, the power output limiter may limit the power output of the electric generator through lowering a target value of the output voltage of the electric generator.

The electric generator further includes a permanent magnet provided on a rotor of the electric generator to increase an amount of magnetic flux in the electric generator, and the temperature of the electric generator determined by the electric generator temperature determiner may be a temperature of the permanent magnet.

Further, the power output limiter may be configured to limit the power output of the electric generator when the temperature of the permanent magnet determined by the electric generator temperature determiner is below a predetermined lower limit.

In the preferred embodiment of the invention, the electric generator further includes a rectifier configured to rectify an AC output of the electric generator to a DC output, and the temperature of the electric generator determined by the electric generator temperature determiner may be a temperature of the rectifier.

In the preferred embodiment of the invention, the temperature of the electric generator determined by the electric generator temperature determiner may be a temperature of the exciting winding.

In the preferred embodiment of the invention, the electric generator further includes a stator winding in which electric current is induced when the exciting current is supplied to the exciting winding during rotation of the electric generator, and the temperature of the electric generator determined by the electric generator temperature determiner may be a temperature of the stator winding.

Further, the control apparatus may include a driving torque determiner that is configured to determine a driving torque of the electric generator based on the temperature of the stator winding determined by the electric generator temperature determiner, the exciting current detected by the exciting current detector, and the rotational speed of the electric generator detected by the rotational speed detector.

The control apparatus may also include an output current determiner that is configured to determine an output current of the electric generator based on the temperature of the stator winding determined by the electric generator temperature determiner, the exciting current detected by the exciting current detector, and the rotational speed of the electric generator detected by the rotational speed detector.

In the preferred embodiment of the invention, the electric generator is an automotive alternator.

In the preferred embodiment of the invention, all of the control apparatus temperature detector, the rotational speed detector, the exciting current detector, and the electric generator temperature determiner are integrated into a single IC chip.

Consequently, through providing the above electric generator temperature detecting device and control apparatus, the objects of the present invention are achieved.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the accompanying drawings.

DESCRIPTION OF THE PREFERRED EMBODIMENT

Figure 1:
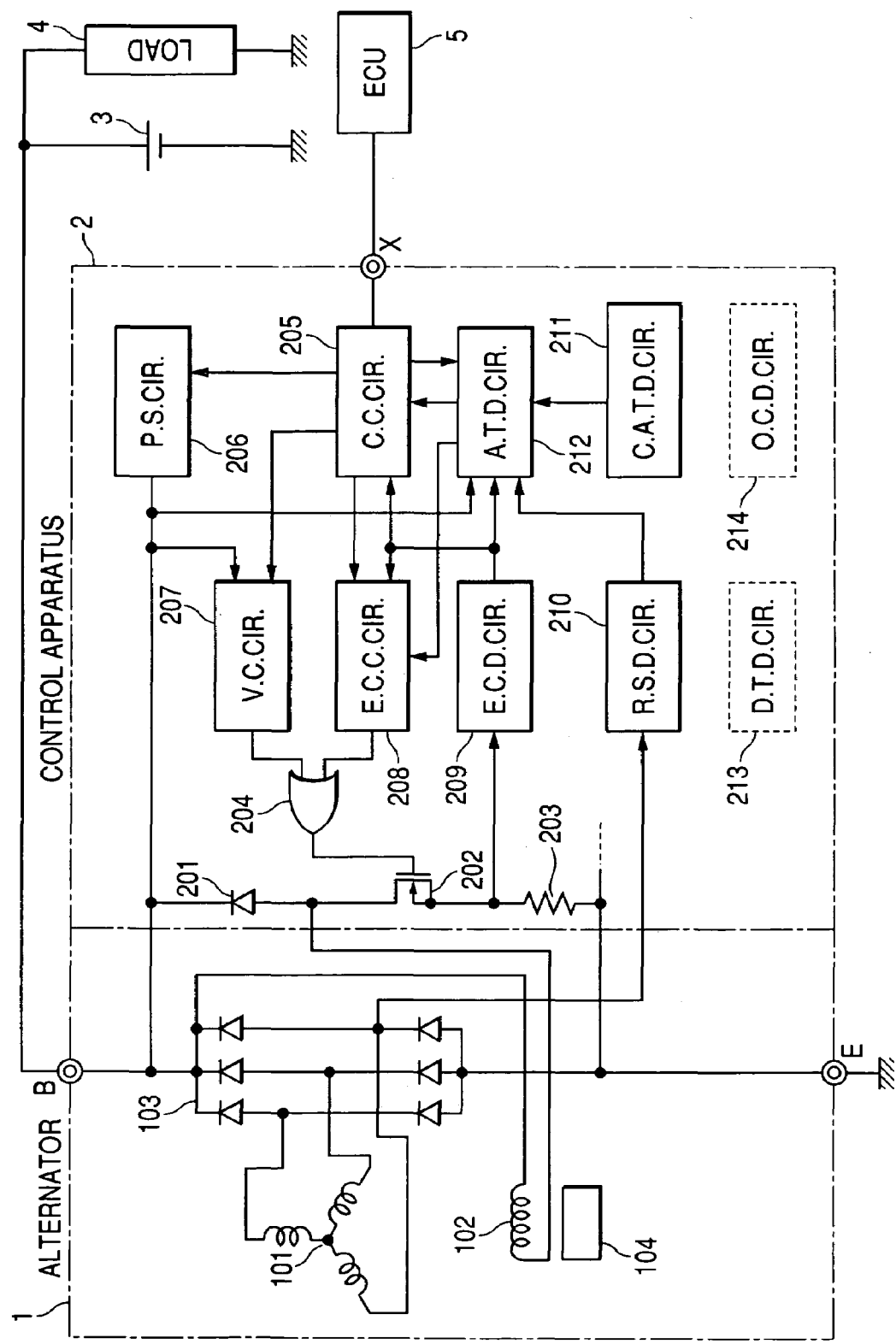
FIG. 1 is a schematic view showing the overall configuration of a control apparatus according to an embodiment of the present invention for controlling an automotive alternator.

The preferred embodiment of the present invention will be described hereinafter with reference to FIGS. 1-4.

It should be noted that, for the sake of clarity and understanding, identical components having identical functions in each of the figures have been marked with the same reference numerals.

FIG. 1 shows the overall configuration of a control apparatus 2 according to an embodiment of the invention.

As shown in FIG. 1, the control apparatus 2 is included in an electric power generation system of a motor vehicle to control an automotive alternator 1.

The alternator 1 includes a three-phase stator winding 101, an exciting winding 102, and a rectifying circuit 103. The stator winding 101 and the exciting winding 102 are respectively provided on a stator and a rotor of the alternator 1. The rectifying circuit 103 is configured to full-wave rectifying a three-phase AC output from the stator winding 21 to obtain a DC output.

The alternator 1 also includes an output terminal B that is connected to both a battery 3 and an electrical load 4, so that the battery 3 and the electrical load 4 can be supplied with electric current necessary for charge and operation.

In addition, in this embodiment, the alternator 1 further includes, though not essentially, a permanent magnet 104 that is provided on the rotor to increase the amount of magnetic flux in the alternator 1.

The control apparatus 2 is configured to control supply of an exciting current to the exciting winding 102 of the alternator 1, so as to bring the voltage at the output terminal B of the alternator 1 into agreement with a predetermined target voltage Vtar, for example, of 14 V.

The control apparatus 2 includes, as shown in FIG. 1, a freewheeling diode 201, a power transistor 202, a current-sensing resistor 203, an AND circuit 204, a communication control circuit 205, a power supply circuit 206, a voltage control circuit 207, an exciting current control circuit 208, an exciting current detecting circuit 209, a rotational speed detecting circuit 210, a control apparatus temperature detecting circuit 211, and an alternator temperature determining circuit 212. In addition, the control apparatus 2 further includes a communication terminal X connected to an ECU (Electronic Control Unit) 5 which is an eternal control apparatus with respect to the control apparatus 2.

The power transistor 202 is configured with an n-channel MOSFET. The power transistor 202 is connected in series with the exciting winding 102, so that the exciting winding 102 can be supplied with the exciting current when the power transistor 202 is switched on. On the other hand, the freewheeling diode 201 is connected in parallel with the exciting winding 102, so that the exciting current flowing in the exciting winding 102 can be recovered when the power transistor 202 is switched from on to off.

The current-sensing resistor 203 is connected between the source of the power transistor 202 and an earth terminal E. The current-sensing resistor 203 is provided for detection of the exciting current flowing in the exciting winding 102 when the power transistor 202 is turned on.

The AND circuit 204 has an output terminal connected to the gate of the power transistor 202 and two input terminals that are respectively connected to the voltage control circuit 207 and the exciting current control circuit 208. The AND circuit 204 works to provide the power transistor 202 with a drive signal which represents a logical multiplication of output signals from the voltage control circuit 207 and the exciting current control circuit 208.

Control of the exciting current supply to the exciting winding 102 of the alternator 1 by the control apparatus 2 is as follows.

When the ignition key-switch (not shown) of the vehicle is turned on, the ECU 5 sends an operation start signal to the communication terminal X, via which the communication control circuit 205 of the control apparatus 2 performs a serial intercommunication with the ECU 5.

Upon receiving the operation start signal, the communication control circuit 205 provides a power-supply-on signal to the power supply circuit 206, which causes the power supply circuit 206 to start supplying operation voltages to all of the circuits in the control apparatus 2.

Further, the ECU 5 sends a target voltage signal, which represents the predetermined target voltage Vtar, to the control apparatus 2.

After start of rotation of the engine that drives the alternator 1, when the electrical load 4 is low, the control apparatus 2 controls the alternator 1 to bring the output voltage VB of the alternator 1 (i.e., the voltage at the output terminal B) into agreement with the predetermined target voltage Vtar.

More specifically, the communication control circuit 205 receives the target voltage signal from the ECU 5 via the communication terminal X and provides the received signal to the voltage control circuit 207, to which the output voltage VB of the alternator 1 is also inputted.

The voltage control circuit 207 compares the output voltage VB of the alternator 1 with the target voltage Vtar and determines the deviation therebetween. Then, the voltage control circuit 207 outputs a duty control signal, which corresponds to the deviation between the voltages VB and Vtar, to the power transistor 202 via the AND circuit 204.

The power transistor 202 is then turned on off according to the duty control signal, so that the exciting current is intermittently supplied to the exciting winding 102 of the alternator 1, thereby bring the output voltage VB of the alternator 1 into agreement with the target voltage Vtar.

For the same time as the above control based on the target voltage Vtar, the exciting current detecting circuit 209 detects the exciting current Ie supplied to the exciting winding 102 of the alternator 1 based on the voltage across the current-sensing resistor 203. Then, the exciting current detecting circuit 209 provides an exciting current signal, which represents the detected exciting current Ie, to the communication control circuit 205, the exciting current control circuit 208, and the alternator temperature determining circuit 212.

Also for the same time, the rotational speed detecting circuit 210 inputs a single phase voltage of the stator winding 101 and detects the rotational speed Nalt of the alternator 1 based on the frequency of the single phase voltage signal which depends on the rotational speed Nalt. Then, the rotational speed detecting circuit 210 provides a rotational speed signal, which represents the detected rotational speed Nalt, to the alternator temperature determining circuit 212.

Also for the same time, the control apparatus temperature detecting circuit 211 detects the temperature Tc of the control apparatus 2 and provides a control apparatus temperature signal representative of the detected temperature to the alternator temperature determining circuit 212. The control apparatus temperature detecting circuit 211 may include a thermistor as temperature-sensing element. Otherwise, it may utilize at least one existing diode in the control apparatus 2 as temperature-sensing element.

Then, the alternator temperature determining circuit 212 determines, based on the exciting current signal, the rotational speed signal, the control apparatus temperature signal, and the output voltage VB of the alternator 1, the temperature of each component of the alternator 1 and outputs an alternator temperature signal representative of the determined temperature to the communication control circuit 205.

In addition, in the present embodiment, all of the circuits in the control apparatus 2 are integrated into a single IC chip. Since the control apparatus temperature detecting circuit 211 is thermally connected to the power transistor 202, the temperature Tc of the control apparatus 2 detected thereby is influenced by the exciting current Ie passing through the power transistor 202. Further, the control apparatus 2 is thermally connected to both the ambient air and the alternator 1 and cooled by a cooling fan (not shown) provided on the rotor of the alternator 1. Since the cooling effect on the control apparatus 2 by the cooling fan depends on the rotational speed Nalt of the alternator 1, the temperature Tc of the control apparatus 2 is also influenced by the rotational speed Nalt of the alternator 1. Accordingly, the temperature Tc of the control apparatus 2 depends on the exciting current Ie, the ambient air temperature Ta, and the rotational speed Nalt of the alternator 1. In other words, the ambient air temperature Ta can be determined based on the temperature Tc, the rotational speed Nalt, and the exciting current Ie. Furthermore, since the temperature of each component of the alternator 1 depends on the ambient air temperature Ta and the power output of the alternator 1, it can be determined based on the temperature Tc, the rotational speed Nalt, the exciting current Ie, and the output voltage VB of the alternator 1.

The communication control circuit 205 sends to the ECU 5 the exciting current signal from the exciting current detecting circuit 209 and the alternator temperature signal from the alternator temperature determining circuit 212.

Figure 2:
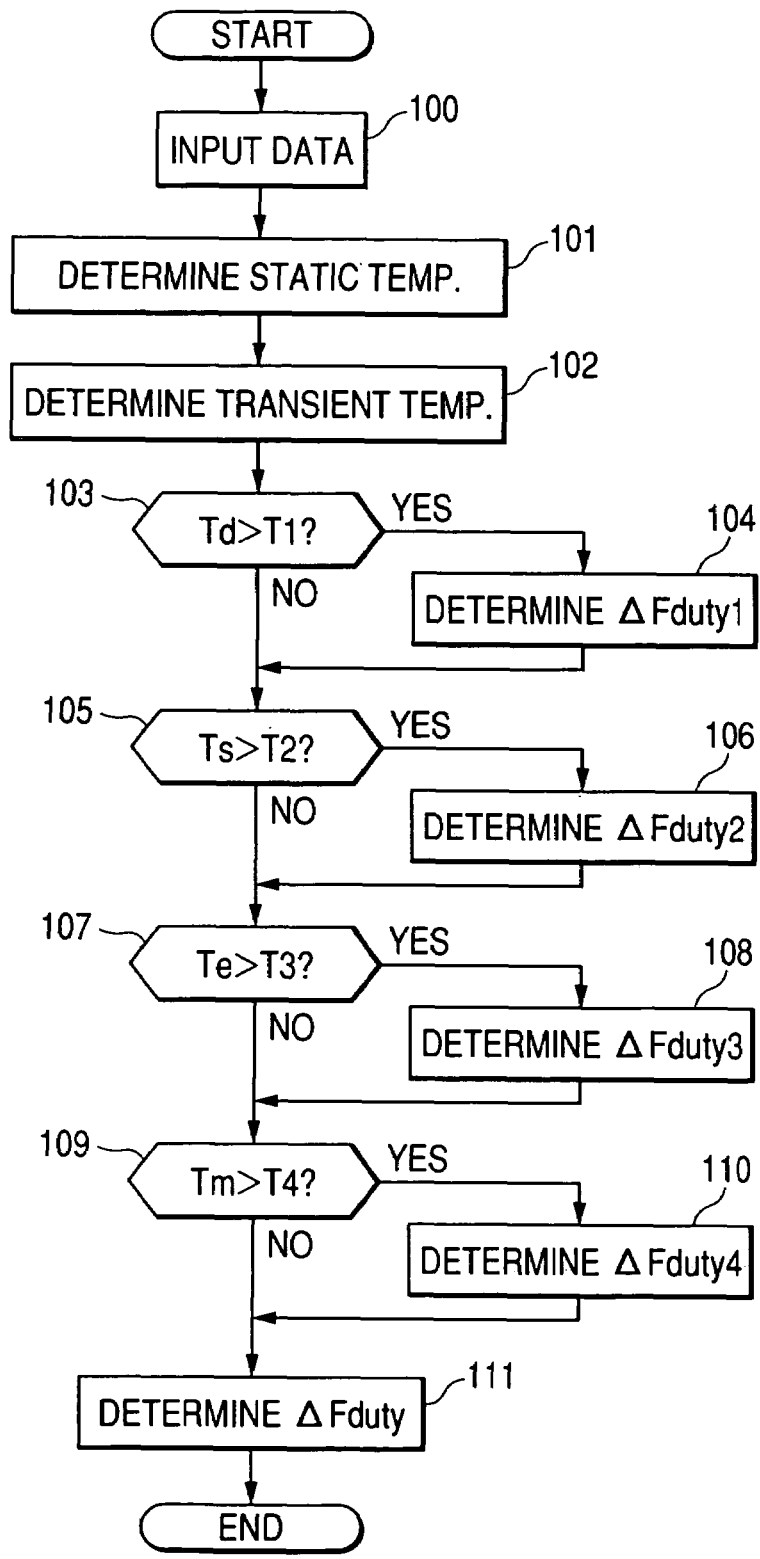
FIG. 2 is a flow chart illustrating a process of the control apparatus of FIG. 1 for determining the temperature of each component of the alternator and controlling the alternator based on the determined temperature.

FIG. 2 illustrates a process of the control apparatus 2 for determining the temperature of each component of the alternator 1 and controlling the alternator 1 based on the determined temperature. This process is periodically performed at predetermined time intervals.

First, as indicated at the step 100, the alternator temperature determining circuit 212 inputs all of the data necessary for the temperature determination. Those data includes the rotational speed Nalt of the alternator 1 detected by the rotational speed detecting circuit 210, the exciting current Ie detected by the exciting current detecting circuit 209, the temperature Tc of the control apparatus 2 detected by the control apparatus temperature detecting circuit 211, and the output voltage VB of the alternator 1.

Based on the inputted data, as indicated at the step 101, the alternator temperature determining circuit 212 determines the temperatures which components of the alternator 1 have in a static state, by using predetermined operation parameters.

More specifically, the operation parameters are predetermined depending on the product type of the alternator 1. In other words, the operation parameters are specific to the alternator type to which the alternator 1 belongs. The control apparatus 2 includes a nonvolatile memory (not shown), in which are previously stored map data that correspond to the predetermined operation parameters. For example, it is possible to previously store in the nonvolatile memory map data corresponding to a plurality of product types and select only the map data corresponding to the product type of the alternator 1 before shipment. Otherwise, it is also possible to previously write into the nonvolatile memory only the map data corresponding to the product type of the alternator 1 before shipment. The map data represent the actual temperature measurements of all components of the alternator 1 by in combinations of the input parameters including Nalt, If, Tc, and VB.

Based on the determined static temperatures, as indicated at the step 102, the alternator temperature determining circuit 212 further determines the temperatures, which the components of the alternator 1 have at a present time instant during a transient state, by using predetermined operation parameters associated with the rates of changes in the temperatures of the components during the transient state. By way of example, those predetermined operation parameters may be the time constants for the changes in the temperatures of the components during the transient state.

More specifically, let $\tau$ represent the time constant for the change in the temperature of each component of the alternator 1 during the transient state, Tconst represent the static temperature of the component, T0 represent the temperature of the component at a previous time instant during the transient state, t represent the time intervals for the computation, then the temperature T of the component at the present time instant can be determined by the fowling equation:

$$T = (T\text{const} - T0) \times (1 - \exp(-t/\tau)) \qquad (1)$$

Consequently, using the above equation (1), the temperatures of all the components of the alternator 1 at the present time instant are obtained, such as the temperature Td of the rectifying circuit 103, the temperature Ts of the stator winding 101, the temperature Te of the exciting winding 102, and the temperature Tm of the permanent magnet 104. In addition, the time constant $\tau$ has different values for different components of the alternator 1.

At the step 103, the alternator temperature determining circuit 212 determines whether or not the temperature Td of the rectifying circuit 103 is above a predetermined upper limit T1.

If the above determination yields a "NO" answer, then the process directly goes to the step 105.

Otherwise, if the above determination yields a "YES" answer, then the alternator temperature determining circuit 212 determines a first limiting amount ΔFduty1 of the exciting current which is proportional to the difference between the temperatures Td and T1, as indicated at the step 104.

At the step 105, the alternator temperature determining circuit 212 further determines whether or not the temperature Ts of the stator winding 101 is above a predetermined upper limit T2.

If the determination at the step 105 yields a "NO" answer, then the process directly proceeds to the step 107.

Otherwise, it the above determination yields a "YES" answer, then the alternator temperature determining circuit 212 determines a second limiting amount ΔFduty2 of the exciting current which is proportional to the difference between the temperatures Ts and T2, as indicated at the step 106.

At the step 107, the alternator temperature determining circuit 212 further determines whether or not the temperature Te of the exciting winding 102 is above a predetermined upper limit T3.

If the determination at the step 107 yields a "NO" answer, then the process directly goes to the step 109.

Otherwise, it the above determination yields a "YES" answer, then the alternator temperature determining circuit 212 determines a third limiting amount ΔFduty3 of the exciting current which is proportional to the difference between the temperatures Te and T3, as indicated at the step 108.

At the step 109, the alternator temperature determining circuit 212 further determines whether or not the temperature Tm of the permanent magnet 104 is above a predetermined upper limit T4.

If the determination at the step 109 yields a "NO" answer, then the process directly proceeds to the step 111.

Otherwise, it the above determination yields a "YES" answer, then the alternator temperature determining circuit 212 determines a fourth limiting amount ΔFduty4 of the exciting current which is proportional to the difference between the temperatures Tm and T4, as indicated at the step 110.

At the step 111, the alternator temperature determining circuit 212 selects the maximum limiting amount ΔFdutymax from ΔFduty1, ΔFduty2, ΔFduty3, and ΔFduty4 and determines the selected ΔFdutymax as the final limiting amount ΔFduty of the exciting current.

This limiting amount ΔFduty of the exciting current is then provided to the exciting current control circuit 208.

Based on the received limiting amount ΔFduty, the exiting current control circuit 208 generates and outputs a duty limitation signal that has the same frequency as the duty control signal outputted from the voltage control circuit 207 and a duty less than that of the duty control signal from the voltage control circuit 207 by the limiting amount ΔFduty.

Consequently, the duty of the on/off operation of the power transistor 202 is decreased by the limiting amount ΔFduty, thereby limiting the power output of the alternator 1. As a result, the temperatures of the components of the alternator 1 are prevented from being excessively increased, thereby preventing overheating of the alternator 1.

The above-described control apparatus 2 according to the present embodiment has the following advantages.

First, in the present embodiment, the control apparatus 2 determines the ambient air temperature Ta based on the temperature Tc of the control apparatus 2, the rotational speed Nalt of the alternator 1, and the exciting current Ie supplied to the alternator 1. Consequently, it becomes possible for the control apparatus 2 to accurately determine the ambient air temperature Ta. Further, with the accurately determined ambient air temperature Ta, it accordingly becomes possible for the control apparatus 2 to determine the temperature of each component of the alternator 1 with high accuracy.

In the present embodiment, when the alternator 1 operates in a transient state due to a large change, for example, in the ambient air temperature Ta or in the electrical load 4, the control apparatus 2 determines the transient temperature of each component of the alternator 1 at any time instant during the transient state based on the static temperature of the component and the operation parameter associated with the rate of change in the temperature of the component during the transient state. Consequently, with the determined transient temperatures of the components of the alternator 1, it becomes possible for the control apparatus 2 to more suitably control the power output of the alternator 1 during the transient state.

In the present embodiment, the output voltage VB of the alternator 1 is also taken into consideration in the temperature determination process of the control apparatus 2. Consequently, it becomes possible for the control apparatus 2 to accurately determine the temperature of each component of the alternator 1 when the output voltage VB of the alternator 1 changes.

In the present embodiment, the operation parameters used in the temperature determination process of the control apparatus 2 are specific to the productive type of the alternator 1. Consequently, it becomes possible for the control apparatus 2 to more accurately determine the temperatures of the components of the alternator 1 based on the product type of the alternator 1.

In the present embodiment, the control apparatus 2 limits the power output of the alternator 1 when the temperature of any component of the alternator 1 exceeds the corresponding upper limit. Consequently, it becomes possible for the control apparatus 2 to suppress the further increase in the temperature of the component above the upper limit, thereby preventing overheating of the component.

In the present embodiment, the control apparatus 2 limits the power output of the alternator 1 through limiting the duty of the on/off operation of the power transistor 202, in other words, through limiting the duty of the intermittent exciting current supply to the exciding winding 102. Consequently, it becomes possible for the control apparatus 2 to directly and reliably limit the power out of the alternator 1.

In the present embodiment, the control apparatus 2 accurately determines the temperature Td of the rectifying circuit 103 and limits the power output of the alternator 1 when Td exceeds the upper limit T1. Consequently, it becomes possible to prevent failure of the rectifying circuit 103 due to excessive heat and ensure a long service life of the rectifying circuit 103.

In the present embodiment, the control apparatus 2 accurately determines the temperature Ts of the stator winding 101 and limits the power output of the alternator 1 when Ts exceeds the upper limit T2. Consequently, it becomes possible to prevent the insulation coating on the stator winding 101 from being deteriorated or damaged due to excessive heat.

In the present embodiment, the control apparatus 2 accurately determines the temperature Te of the exciting winding 102 and limits the power output of the alternator 1 when Te exceeds the upper limit T3. Consequently, it becomes possible to prevent the insulation coating on the exciting winding 101 from being deteriorated or damaged due to excessive heat.

In the present embodiment, the control apparatus 2 accurately determines the temperature Tm of the permanent magnet 104 and limits the power output of the alternator 1 when Tm exceeds the upper limit T4. Consequently, it becomes possible to prevent the permanent magnet 104 from being degaussed due to excessive heat.

Figure 3:
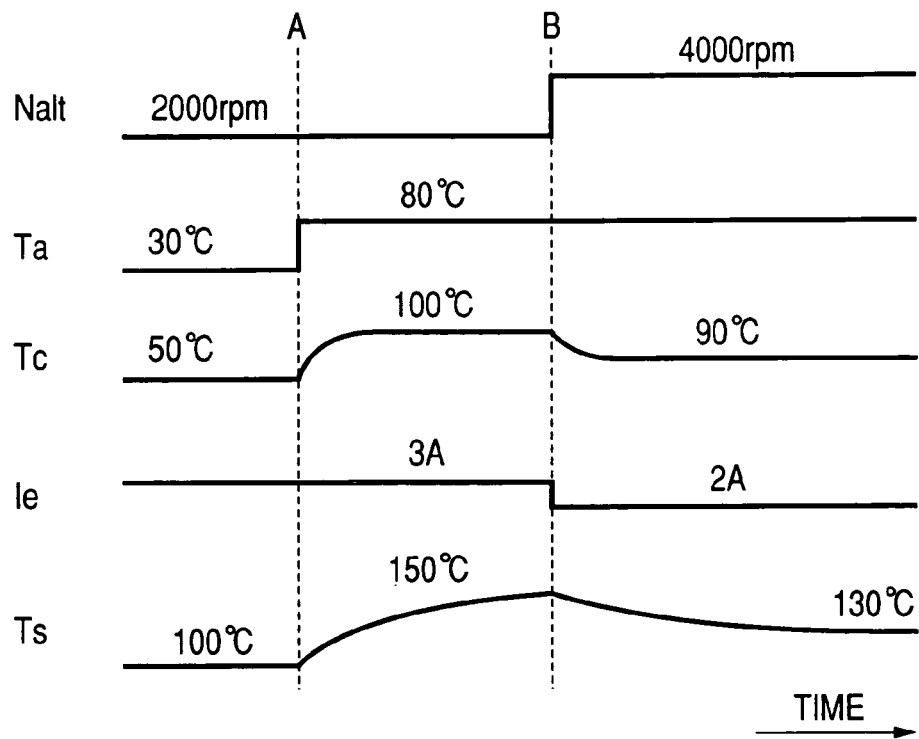
FIG. 3 is a time chart illustrating the changes in temperature of a stator winding of the alternator and the control apparatus of FIG. 1 when the electrical load of the alternator is constant and the rotational speed of the alternator or the ambient air temperature changes.

FIG. 3 comparatively shows the changes in temperature of the stator winding 101 of the alternator 1 and the control apparatus 2, which are determined by the alternator temperature determining circuit 212 of the control apparatus 2, when the electrical load 4 (not shown in FIG. 3) keeps constant and the rotational speed Nalt of the alternator 1 or the ambient air temperature Ta changes.

As shown in FIG. 3, after an increase in the ambient air temperature Ta from 30° C. to 80° C. at a time instant A, the temperature Ts of the stator winding 101 increases gradually while the temperature Tc of the control apparatus 2 increases rapidly Further, after an increase in the rotational speed Nalt of the alternator 1 from 2000 rpm to 4000 rpm at a time instant B, the temperature Ts of the stator winding 101 decreases gradually while the temperature Tc of the control apparatus 2 decreases rapidly due to an increase in the cooling effect by the cooling fan of the alternator 1 with the increase in the rotational speed Nalt.

Figure 4:
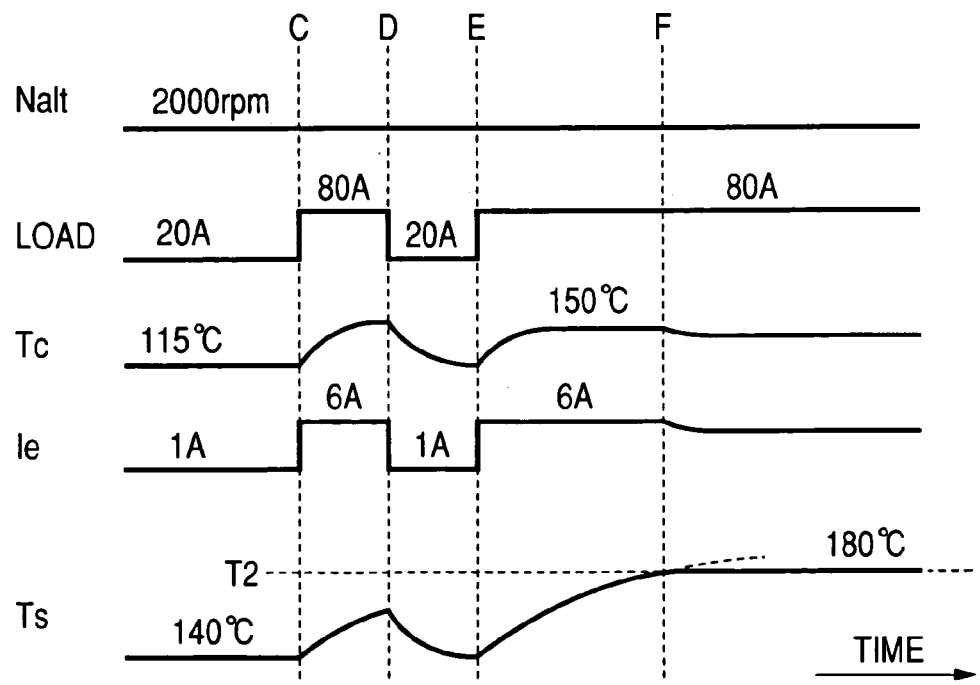
FIG. 4 is a time chart illustrating the changes in temperature of the stator winding of the alternator and the control apparatus of FIG. 1 when both the ambient air temperature and the rotational speed of the alternator are constant and the electrical load of the alternator changes.

FIG. 4 comparatively shows the changes in temperature of the stator winding 101 of the alternator 1 and the control apparatus 2, which are determined by the alternator temperature determining circuit 212 of the control apparatus 2, when both the ambient air temperature Ta (not shown in FIG. 4) and the rotational speed Nalt of the alternator 1 keep constant and the electrical load 4 changes.

As shown in FIG. 4, after an increase in the electrical load 4 from 20 A to 80 A at a time instant C, the temperature Ts of the stator winding 101 increases gradually while the temperature Tc of the control apparatus 2 increases rapidly. Further, after a decrease in the electrical load 4 from 80 A to 20 A at a time instant D shortly after the time instant C, the temperature Ts of the stator winding 101, which has not yet reached the upper limit T2 of 180° C. by the time instant D, decreases gradually. Furthermore, after another increase in the electrical load 4 from 20 A to 80 A at a time instant E, the temperature Ts of the stator winding 101 again increases gradually and reaches the upper limit T2 at a time instant F. Then, the control apparatus 2 performs the control of limiting the power output of the alternator 1, thereby keeping the temperature Ts of the stator winding 101 from further increasing.

While the above particular embodiment of the invention has been shown and described, it will be understood by those who practice the invention and those skilled in the art that various modifications, changes, and improvements may be made to the invention without departing from the spirit of the disclosed concept.

For example, in the previous embodiment, the control apparatus 2 is configured to determine the temperature Td of the rectifying circuit 103, the temperature Ts of the stator winding 101, the temperature Te of the exciting winding 102, and the temperature Tm of the permanent magnet 104.

However, the control apparatus 2 may also be configured to determine the temperature of any other component or portion of the alternator 1 which has association with at least one of the rotational speed Nalt of the alternator 1, the exciting current Ie, the temperature Tc of the control apparatus 2, and the output voltage VB of the alternator 1 and can be actually measured to prepare the necessary map data.

Moreover, the control apparatus 2 may also be configured to further include a driving torque determining circuit 213 (shown in FIG. 1 with dashed lines omitting the connection thereof with other circuits), which can accurately determine the driving torque of the alternator 1, without any additional torque sensor, based on the temperature Ts of the stator winding 101, the rotational speed Nalt of the alternator 1, the exciting current Ie, and the output voltage VB of the alternator 1, by using predetermined operation parameters. As a result, it would become possible for the control apparatus 2 to accurately detect the driving torque of the alternator 1 without increasing the manufacturing cost thereof.

Similarly, the control apparatus 2 may also be configured to further include an output current determining circuit 214 (shown in FIG. 1 with dashed lines omitting the connection thereof with other circuits), which can accurately determine the output current of the alternator 1, without any additional current sensor, based on the temperature Ts of the stator winding 101, the rotational speed Nalt of the alternator 1, the exciting current Ie, and the output voltage VB of the alternator 1, by using predetermined operation parameters. As a result, it would become possible for the control apparatus 2 to accurately detect the output current of the alternator 1 without increasing the manufacturing cost thereof.

Furthermore, in the previous embodiment, the temperature of each component of the alternator 1 is determined by the alternator temperature determining circuit 212 of the control apparatus 2. However, the control apparatus 2 may also be configured to send all of the data necessary for the temperature determination to the ECU 5 via the communication terminal X, so that the ECU 5 could determine the temperature of each component of the alternator 1 based on the received data.

Similarly, instead of including therein the driving torque determining circuit 213 and the output current determining circuit 214, the control apparatus 2 may also be configured to send all of the data necessary for the driving torque and the output current determination to the ECU 5 via the communication terminal X, so that the ECU 5 could determine the driving torque and the output current of the alternator 1 based on the received data.

Moreover, in the previous embodiment, the control apparatus 2 is configured to limit the power output of the alternator 1 through decreasing the duty of the intermittent exciting current supply to the alternator 1. However, the control apparatus 2 may also be configured to limit the power output of the alternator 1 through lowering the target voltage Vtar.

Furthermore, in the previous embodiment, the control apparatus 2 is configured to limit the power output of the alternator 1 when the temperature of each component of the alternator 1 exceeds the corresponding upper limit.

However, in the case that the permanent magnet 104 of the alternator 1 is configured with a rare earth magnet, it is easy for the permanent magnet 104 to be degaussed at low temperatures. Accordingly, in this case, the control apparatus 2 may further be configured to increase the power output of the alternator 1 when the temperature Tm of the permanent magnet 104 drops below a predetermined lower limit T5, thereby preventing the permanent magnet 104 from being degaussed.

Such modifications, changes, and improvements within the skill of the art are possible within the scope of the appended claims.

What is claimed is:

1. An electric generator temperature detecting device for detecting a temperature of an electric generator, comprising:
   a control apparatus temperature detector configured to detect a temperature of a control apparatus, which is electrically connected to an electric generator including an exciting winding and controls supply of an exciting current to the exciting winding, and output a control apparatus temperature signal representative of the detected temperature of the control apparatus;
   a rotational speed detector configured to detect a rotational speed of the electric generator and output a rotational speed signal representative of the detected rotational speed;
   an exciting current detector configured to detect the exciting current supplied to the exciting winding of the electric generator and output an exciting current signal representative of the detected exciting current; and
   an electric generator temperature determiner configured to determine a temperature of the electric generator based on the control apparatus temperature signal from the control apparatus temperature detector, the rotational speed signal from the rotational speed detector, the exciting current signal from the exciting current detector, and an output voltage of the electric generator and output an electric generator temperature signal representative of the determined temperature of the electric generator.

2. The electric generator temperature detecting device as set forth in claim 1, wherein the electric generator temperature determiner is configured to determine:
   a static temperature which the electric generator has in a static state thereof; and
   a transient temperature, which the electric generator has at a time instant during a transient state thereof, based on the static temperature and a predetermined operation parameter associated with a rate of change in the temperature of the electric generator during the transient state.

3. The electric generator temperature detecting device as set forth in claim 2, wherein the operation parameter is a time constant for the change in the temperature of the electric generator during the transient state.

4. The electric generator temperature detecting device as set forth in claim 1, wherein the electric generator temperature determiner is configured to determine the temperature of the electric generator by using predetermined operation parameters that are specific to an electric generator type to which the electric generator belongs.

5. The electric generator temperature detecting device as set forth in claim 1, wherein the electric generator temperature detecting device is integrated into the control apparatus.

6. The electric generator temperature detecting device as set forth in claim 5, wherein the control apparatus further includes a communication controller that is configured to control communication of the control apparatus with an external, and wherein the communication controller sends the electric generator temperature signal from the electric generator temperature determiner to the external.

7. The electric generator temperature detecting device as set forth in claim 5, wherein the control apparatus further includes a power output limiter that is configured to limit a power output of the electric generator when the temperature of the electric generator determined by the electric generator temperature determiner is above a predetermined upper limit.

8. The electric generator temperature detecting device as set forth in claim 7, wherein the control apparatus further includes a switch that is configured to be selectively turned on and off to intermittently supply the exciting current to the exciting winding of the electric generator, and wherein the power output limiter limits the power output of the electric generator through decreasing a duty of the on/off operation of the switch.

9. The electric generator temperature detecting device as set forth in claim 7, wherein the power output limiter limits the power output of the electric generator through lowering a target value of the output voltage of the electric generator.

10. The electric generator temperature detecting device as set forth in claim 7, wherein the electric generator further includes a permanent magnet provided on a rotor of the electric generator to increase an amount of magnetic flux in the electric generator, and wherein the temperature of the electric generator determined by the electric generator temperature determiner is a temperature of the permanent magnet.

11. The electric generator temperature detecting device as set forth in claim 10, wherein the power output limiter is further configured to limit the power output of the electric generator when the temperature of the permanent magnet determined by the electric generator temperature determiner is below a predetermined lower limit.

12. The electric generator temperature detecting device as set forth in claim 1, wherein the electric generator further includes a rectifier configured to rectify an AC output of the electric generator to a DC output, and wherein the temperature of the electric generator determined by the electric generator temperature determiner is a temperature of the rectifier.

13. The electric generator temperature detecting device as set forth in claim 1, wherein the temperature of the electric generator determined by the electric generator temperature determiner is a temperature of the exciting winding.

14. The electric generator temperature detecting device as set forth in claim 1, wherein the electric generator further includes a stator winding in which electric current is induced when the exciting current is supplied to the exciting winding during rotation of the electric generator, and wherein the temperature of the electric generator determined by the electric generator temperature determiner is a temperature of the stator winding.

15. The electric generator temperature detecting device as set forth in claim 14, wherein the control apparatus further includes a driving torque determiner that is configured to determine a driving torque of the electric generator based on the temperature of the stator winding determined by the electric generator temperature determiner, the exciting current detected by the exciting current detector, and the rotational speed of the electric generator detected by the rotational speed detector.

16. The electric generator temperature detecting device as set forth in claim 14, wherein the control apparatus further includes an output current determiner that is configured to determine an output current of the electric generator based on the temperature of the stator winding determined by the electric generator temperature determiner, the exciting current detected by the exciting current detector, and the rotational speed of the electric generator detected by the rotational speed detector.

17. The electric generator temperature detecting device as set forth in claim 1, wherein the electric generator is an automotive alternator.

18. The electric generator temperature detecting device as set forth in claim 1, wherein all of the control apparatus temperature detector, the rotational speed detector, the exciting current detector, and the electric generator temperature determiner are integrated into a single IC chip.

* * * * *